United States Patent Office 3,501,026
Patented Mar. 17, 1970

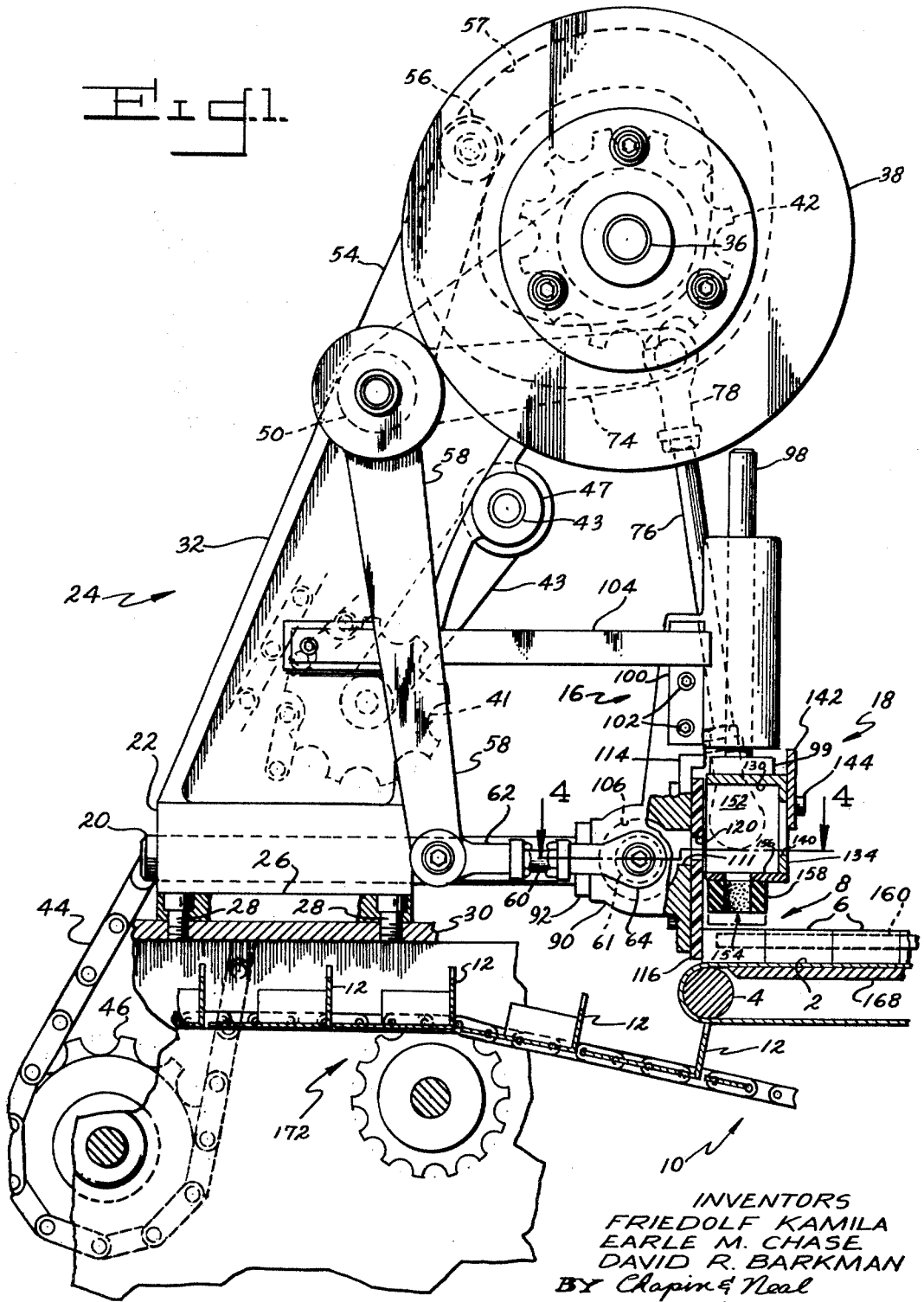

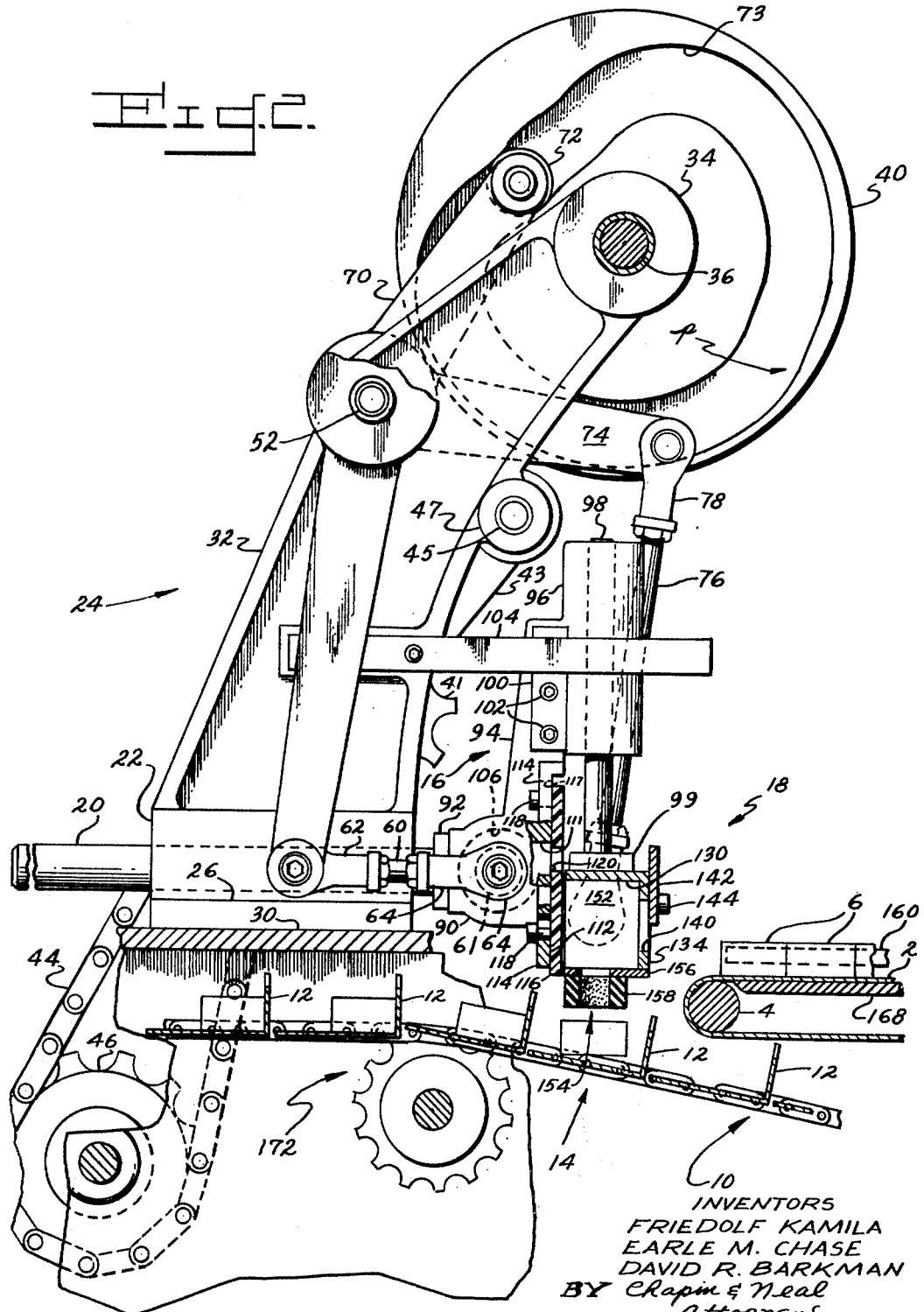

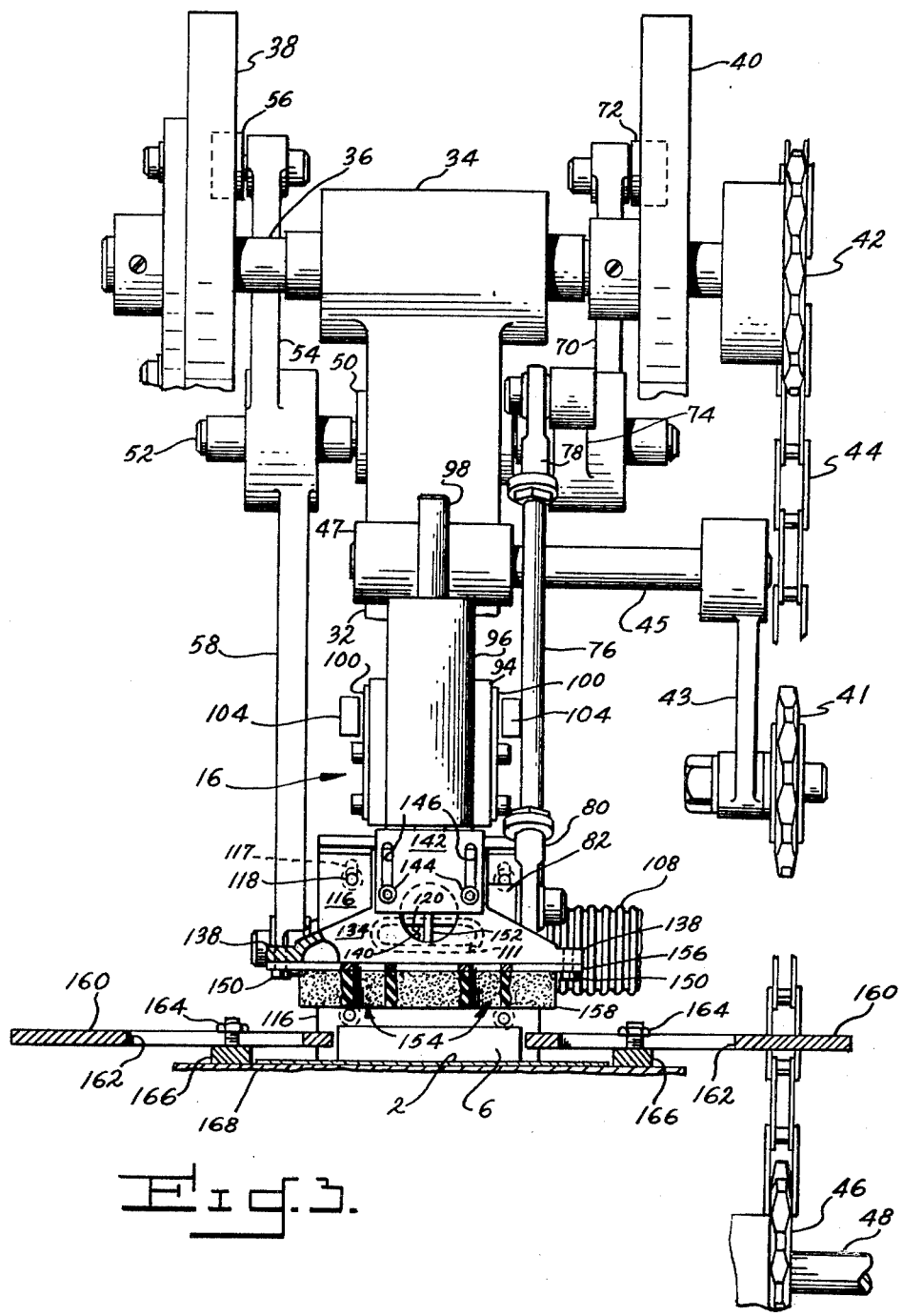

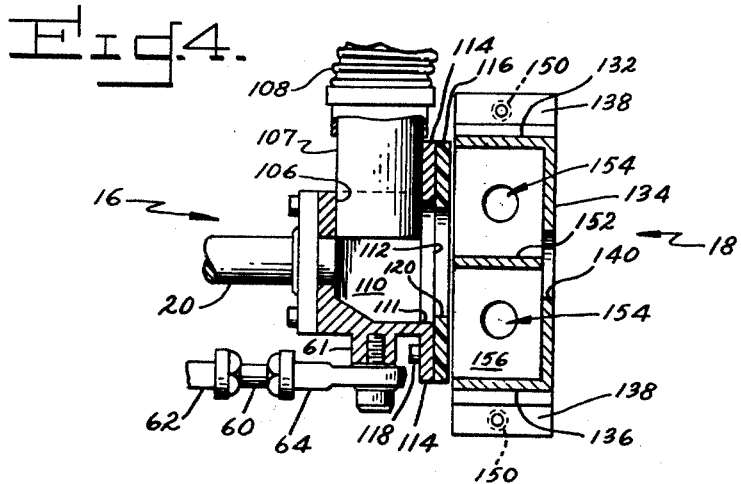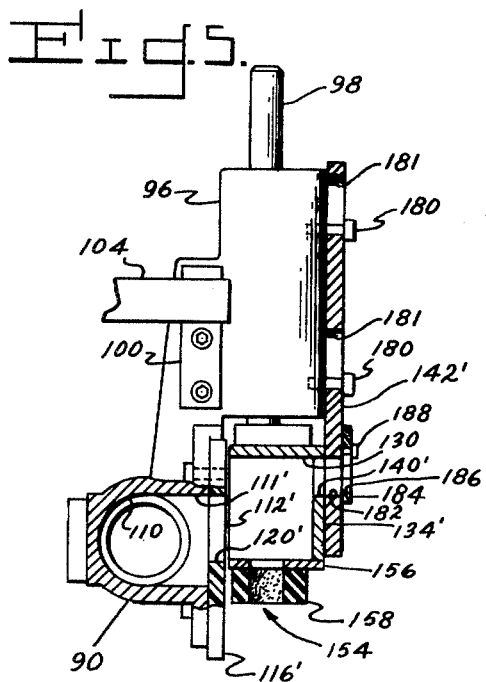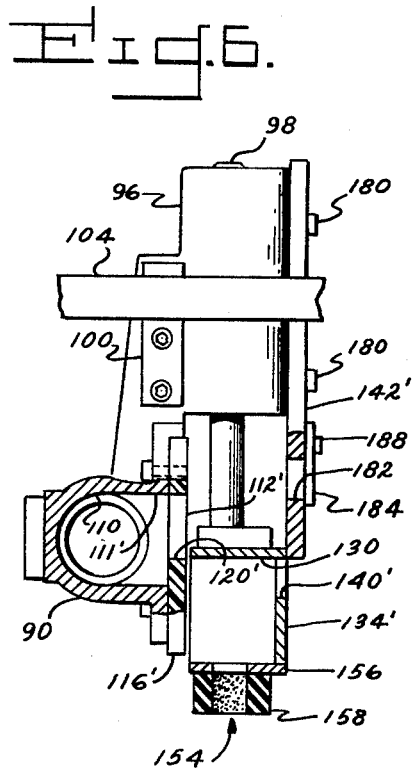

3,501,026
ARTICLE TRANSFER APPARATUS FOR CANDY BARS AND THE LIKE
Friedolf Kamila, Longmeadow, Earle M. Chase, Wilbraham, and David R. Barkman, Longmeadow, Mass., assignors to Package Machinery Company, East Longmeadow, Mass., a corporation of Massachusetts
Filed Feb. 6, 1968, Ser. No. 703,407
Int. Cl. B65g 49/00; B25j 15/06
U.S. Cl. 214—1
16 Claims

ABSTRACT OF THE DISCLOSURE

Article transfer apparatus for candy bars and the like having a carriage reciprocating between pick up and deposit stations and a reciprocating suction head slidably mounted on the carriage having suction passages between the carriage and head with a nozzle to pick up, transfer and deposit the candy bars, the travel of the suction head at the deposit station separating the passages and releasing the bars from the nozzle onto the flights of a moving wrapping machine infeed conveyor.

BACKGROUND

This invention relates to article transfer apparatus of the type adapted to carry in accurately timed sequence a supply of articles such as candy bars and the like from a supply or "pick-up" station to a deposit station, as for loading candy bars onto a moving conveyor having spaced flight or pockets designed to carry such articles into mechanism for wrapping the same. The invention relates particularly to cam operated mechanism having suction passages for picking up the articles by a nozzle carried on a suction head and moving the head to a depositing position where it is lowered to release the articles.

It will readily be appreciated by those skilled in the art of wrapping machinery that most devices for feeding articles, such as candy bars and the like, into the infeed conveyors of such machines, and particularly high-speed machinery of this type, are subject to various and sundry deficiencies. High-speed wrapping machines have now been developed to the extent that they are capable of efficiently wrapping articles such as candy bars at a rate faster than the articles can be efficiently supplied to the infeed conveyors of the machines. Infeed conveyors of many candy bar wrapping machines have until recently been commonly supplied by manual labor. Since the capacity of the machines has been increased to a marked degree, it has been found quite common for such machines to be operated at somewhat less than the normal recommended running capacity, and substantially less than the maximum rated capacity. This is purely because of the inherent limitations in manually supplying infeed conveyors. Automatic article handling apparatus has therefore been designed to "automate" the delivery of a sufficient supply of candy bars to a delivery station where they may be made available for an infeed conveyor at a rate desired for efficient operation of the machine.

In general the wrapping machine capacities here under consideration are on the order of 100 to 150 pieces per minute. An example of one such automatic delivery apparatus showing a plurality of terminal delivery locations, which are automatically supplied with a backlog of articles for transfer into the infeed sections of a plurality of wrapping machines, is disclosed in pending application Ser. No. 654,164 filed July 18, 1967, and now U.S. Patent No. 3,249,416, assigned to the assignee of the present application. In the cited application an infeed conveyor and means for releasing each candy bar thereto is schematically shown. The apparatus of the present invention is designed to successively transfer at the required speeds such candy bars from the terminal end of the conveyor supply system and to deposit each bar between the series of spaced flights or pockets on the rapidly moving infeed conveyor of the wrapping machine.

Among the objects of the invention are to provide a simplified, low-cost transfer mechanism which will operate at the required relatively high speeds, with unerring accuracy, and has a novel cam operated pick-up and depositer mechanism in which a vacuum operated nozzle contacts the candy bars and deposits the same in a manner that will in no way mar or scuff the surface of the bars or otherwise damage the same.

The mechanism of the present invention comprises essentially a reciprocable carriage moving rapidly between a pick-up station (which may be at the terminal end of any suitable delivery means such as an endless conveyor belt) and a deposit station preferably aligned with the endless conveyor belt (and past which an infeed conveyor with spaced flights is continuously moving at a relatively high speed); and an article engaging reciprocable suction head movably mounted on the carriage for travel in a path angularly related to the path of carriage travel and operating to pick up a candy bar, retain it for movement with the carriage, and then extend the bar for deposit, the extension of the suction head separating the passages between carriage and head so as to release and drop the bar onto the infeed conveyor.

The above and other specific objects and advantages of the invention will be fully apparent from the following description of an embodiment thereof as shown in the accompanying drawings, in which:

FIG. 1 is a side elevation of an apparatus embodying the invention with the transfer mechanism positioned at a pick-up station;

FIG. 2 is a view similar to FIG. 1 with parts cut away showing the transfer mechanism positioned at a deposit station;

FIG. 3 is an end elevation as viewed from the right hand side of FIG. 1;

FIG. 4 is a fragmentary sectional view on line 4—4 of FIG. 1; and

FIGS. 5 and 6 are side elevational views of the carriage and suction head members of the apparatus with parts in section and showing an alternate nozzle and porting arrangement for the suction head in the pick-up and deposit positions respectively.

Referring to FIGS. 1 and 2 a delivery means to supply a plurality of articles is indicated by a continuously moving endless belt 2 passing around an end roll 4. The articles to be transferred are shown herein in block form at 6 and represent candy bars or the like and may thus be successively presented at the end of the belt. It will be readily appreciated as will be later described that the shape and form of particular candy bars may differ considerably. Accordingly, the nozzle unit of the apparatus may take various forms to suit the product being handled by the apparatus. The position of the endmost article on the belt 2 is generally designated by the numeral 8 and is herein termed the pick-up station. With reference to the aforesaid application Ser. No. 654,164 belt 2 represents the terminal end of the automatic candy bar delivery system leading to the infeed conveyor of a wrapping machine.

The pick-up station at 8 is shown at one level above a traveling conveyor means shown as a continuous moving infeed conveyor at 10 having spaced pocketing means as formed by successive flights 12 for carrying the articles into a wrapping machine as will be readily understood by those skilled in the art. The path of travel of the chain conveyor is furthermore shown as leading upwardly from below belt 2 and along a horizontal path offset in aligned relation below the end of the pick up station at 8.

Articles such as the bars 6 are delivered on belt 2 in an in-line relation butting up against each other along the end section of the belt. Each endmost article is to be picked up at station 8, carried by the apparatus into the position shown by FIG. 2, and then released to drop into each of the series of advancing pockets between the flights 12 of conveyor 10. The location of article release is herein termed the deposit station and is generally indicated by the numeral 14.

The articles are picked up and released by vacuum operation. The transfer apparatus includes a carrier member or carriage indicated generally by numeral 16. Carriage 16 may be oscillated or moved linearly in a path of travel between a position (FIG. 1) above the pick-up station and a position (FIG. 2) above the deposit station. Associated with the carriage is a vertically reciprocable suction head generally indicated by the numeral 18, and mounted on the carriage for movement to and from a retracted and extended position. The retracted position is shown in FIG. 1. The extended position is shown in FIG. 2.

Carriage 16 is supported for horizontal movement by a guided mounting rod 20 slidably supported in a frame bearing block 22. The bearing block may be of standard internal construction and as shown is part of an upstanding frame supporting a cam operated mechanism for transmitting the reciprocating movement of carriage 16 and suction head 18. The frame is indicated generally by numeral 24. It is provided with a flanged base plate 26 fastened as by screw bolts 28 to a suitable platform support 30. The frame 24 is here shown in the form of an upwardly arched member 32 having at its upper end a bearing block at 34 (see also FIG. 3) in which an axle 36 is journalled. The axle 36 extends outwardly of each side of block 34 and a face cam is carried at each end thereof. One face cam 38 (at the left in FIG. 3) provides the transmitting force for horizontal reciprocation of the carriage 16. The opposing cam 40 (at the right in FIG. 3) is for transmitting the vertical reciprocation of the suction head 18. Also fitted on axle 36 beyond cam 38 is a sprocket 42 connected by a chain 44 to a drive sprocket 46 on a shaft 48 and providing the drive means for face cams 38 and 40. A chain tensioning sprocket 41 is also shown on the end of arm 43 carried on shaft 45 extending from the mounting block at 47 of the frame.

Also formed as a portion of the frame member 24 is a block 50 in which is mounted a pivot shaft 52 extending outwardly of each side of the block. Shaft 52 provides a fulcrum for bell crank cam levers cooperating with the face cams 38 and 40.

Journalled on shaft 52 is the crank lever for driving carirage 16. It has a short upper arm 54 provided with a cam roller 56 mounted at its upper end. A long depending arm of the lever is at 58 and at its lower end this arm is pivotally connected to one end of a rod 60 (see FIGS. 1 and 2) as by a standard connector link at 62. The other end of rod 60 is pivotally attached to the carriage 16 by a connector link 64 mounted on a stud 61 extending from the housing of the carriage (see also FIG. 4). As shown the drive rod 60 for the carrier is adjustable to vary the length thereof for an accurate setting of the stroke between the pick up and deposit stations so as to accommodate various configurations of articles to be transferred.

Referring again to FIG. 3, the bell crank cam lever for transmitting vertical motion to the suction head has an upper short arm 70 provided with a cam roller 72 at its upper end. The other arm 74 of this lever is in acute angular relationship with the upper arm (see also FIGS. 1 and 2) and at its outer end has a pivotal connection with drive rod 76 as indicated by standard connector 78. The rod 76 is adjustable as will be apparent and has a connector 80 at its lower end carried on a stud 82 projecting from one side of the suction head 18.

It will be appreciated that radial movement of the cam follower roller 56 will cause arm 58 to move carriage 16 back and forth in a horizontal path, the cam track or groove for roll 56 being indicated by dotted line representation at 57 in FIG. 1. Radial movement of cam follower roll 72 for the suction head will cause arm 74 to move rod 76 up and down for a vertical path of travel of suction head 18, the track or groove for roll 72 being shown in full at 73 in FIG. 2.

Carriage 16 (FIGS. 1 and 2) is formed with a lower housing projection as the portion shown at 90 from which stud 61 projects for fastening connector 64 of drive rod 60. In the housing portion 90 is a suction passage for communication with the suction head 18 as will be described. The supporting guide rod 20 slidably carried by bearing guide 22 is fitted on the end face of portion 90 having a mounting member at 92 suitably fixed to portion 90. The carriage housing is also formed with an upward extension as indicated at 94 and provided with an overhanging rod bearing guide 96 in which a guide rod 98 is slidably received. Suction head 18 is carried on the lower end of rod 98 being fixed thereon as by a mounting member 99 for vertical movement as will be later described.

The carriage as above noted is reciprocated in a horizontal path and the upper extension portion 94 of the housing is fitted with wear straps 100 fastened at each side thereof as by screw bolts 102. Guide bars at 104 are fixed at each side of frame 24, extend forwardly therefrom at opposite sides of housing 99 and provide for guided movement of the housing.

In housing portion 90 is a port indicated at 106 (see also FIG. 4) in which is fitted a tubing connector 107 on which a flexible hose line 108 is suitably clamped for connection to a source of vacuum. Portion 90 is hollow and forms a chambered passage 110 provided with a suction port at 111 for communication with the chamber of the suction head 18. Port 111 is here shown as an elongated slot as best seen by FIG. 3.

The outer ported wall of the carriage housing has a planar vertical face at 112, the outer peripheral portions of this surface being provided by flanged sections of the housing as at 114. Against face 112 is fitted an adapter plate 116, preferably of nylon composition, fastened thereto as by screw bolts 118 fitting through slots as at 117 (FIGS. 2 and 3) in the flanged portions 114.

Plate 116 is provided with an elongated slotted port 120 of a dimension less than port 111 for reducing the passage therethrough. The plate is removable and may be replaced, as will be apparent, with other like plates having various orifice sizes as may be suitable for reducing or increasing the suction force in order to properly handle candy bars of varying weights and configurations. Furthermore the mounting of the bolts 118 in slots 117 permits limited vertical adjustment of plate 116 as will be later described.

Vertically movable against the surface of the plate 116 is the suction head assembly 18. Fixed to the guide rod 98 by member 99 is a top wall 130 formed with three outer side walls 132, 134, and 136. The fourth side of the head is open and faces plate 116. Side walls 132 and 136 are provided with lower flanged portions as at 138 for attachment of a suitable pick-up nozzle member to the under side of the head as will be described.

As shown by FIGS. 3 and 4 the side wall 134 is provided with a circular opening 140. Against this wall and for adjusting the size of the passage through opening 140 is a shutter 142 (FIG. 3). The shutter is held against the side wall by screw bolts at 144 passing through elongated slots as at 146 for raising and lowering the shutter to vary the size of opening to the suction head chamber. The force of suction applied to the candy bar at the nozzle end may thus be varied without dismantling the head to change plate 116 and constitutes a "fine" adjustment. As will also be apparent the opening 140 will also provide a vent for releasing the article from the pick-up head when the source of vacuum is cut off at the deposit station as will be later described.

The suction head as shown by FIG. 3 has a flared lower portion as indicated by the divergent sides of wall 134. Thus the base of the head is relatively large, is rectangular in cross-section as indicated by FIG. 4, and may be fitted with a wide range of different nozzle members attached to the flanges 138 as by bolts at 150. Furthermore, in the particular form of suction head shown by FIGS. 3 and 4, a central partitioning wall at 152 may be provided to divide the head chamber and channel the force of suction at each side as for a pair of spaced nozzle inlet ports indicated at 154 (FIG. 4) of the particular example of nozzle member shown.

The nozzle at the base of the head comprises a ported attachment plate 156 having fixed at its underside a block 158 of suitable resilient plastic material. Through openings in the block 158 register with openings in plate 156 and constitute the ports 154.

Referring to FIGS. 1 and 3, carriage 16 is shown extended and the suction head 18 at the pick up station. The head and nozzle are in retracted upper condition. It will also be noted that the lower edge portion of plate 116 lies in position to stop further movement of the end candy bar 6 at this station. In such position the nozzle is lowered slightly to pick up the candy bar. The extent of this motion is indicated by dotted line in FIG. 1, whereupon the bar will be drawn upwardly against block 158. The face of a suitably resilient block will conform to a bar surface for securely holding the same even if this surface is uneven or lumpy in character. It will also be appreciated that the movement of belt 2 may be suitably synchronized with the cams governing the reciprocating movemnt of carriage 16 and suction head so that the endmost candy bar will arrive at the pick up station the instant the carriage is fully extended and plate 116 will meet the bar just as the nozzle is lowered to pick it up.

In FIG. 3 the candy bars or other articles are conveniently aligned on belt 2 by adjustable side guide rail members 160. The rails are transversely slotted as indicated at 162 and receive hold down bolts 164 affixed to mounting members 166 as on a supporting platform 168 on which the upper run of the conveyor belt rests. The slotted adjustment of the rails thus provides for the alignment of articles of widely varying widths.

As diagrammatically shown in FIGS. 1 and 2, the infeed conveyor 10 represents a standard type of chain conveyor having flights 12. The travel may be along an upwardly directed inclined path under belt 2 and have an in-line relation to belt 2. The conveyor chains may also be carried over a suitable sprocket arrangement indicated at 172 for passage on a horizontal run to a wrapping machine. It will, of course, be realized that any alternative desired standard construction of infeed conveyor may be utilized so long as it is arranged in suitable fashion to successively receive articles at the deposit station 14.

With reference to FIG. 2 movement of the suction head through engagement of cam roll 72 in groove 73 of cam 40 will now be described. FIG. 2 shows the retracted carriage position and the extended suction head position for release of an article from the station head as will later be described. Roll 72 in FIG. 2 is approximately at its nearest point to the axis of the cam. Cam 40 rotates in a clockwise direction and thus roll 72 will after release of the article be swung outwardly and retract the suction head to hold it in an upper position on the carriage. During such holding movement cam roll 56 of the other cam will concurrently have extended carriage 16 to the FIG. 1 pick-up station position. This is at the mid-point in the cycle of cam rotation and roll 72 will thereupon engage that portion of the track 73 indicated by the arrow p to be moved inwardly to a slight extent (in which position the suction head is carried to the dotted line "pick-up" relationship as in FIG. 1). Continued cam rotation holds the suction head upwardly until a "drop-off" (at the twelve o'clock position, FIG. 2,) at which time carriage 16 is again retracted to the deposit station. At the "drop-off" roll 72 is moved inwardly of the cam axis, extends the suction head, and releases the article at the deposit station 14. It may be noted with reference to FIG. 1 that cam roll 72 is directly positioned behind cam roll 56 at the pick-up station.

Referring now to the action of the suction head in picking up and releasing articles such as candy bars of various configurations, the various means for adjusting the force of suction which may be applied at the nozzle inlet or inlets have been mentioned above. The orifice 120 of adapter plate 116 may be changed; the adjustable shutter 142 can be set for various conditions; and the detachable nozzle member itself may be provided with any suitable type of inlet orifice arrangements including the contouring of the article engaging surface thereof. It will accordingly be appreciated that with the variety of adjustable features available an extremely wide variety of articles of various configurations may be handled for transfer including a nozzle porting arrangement for picking up two or three pieces for depositing on a wrapper infeed conveyor for wrapping by a single wrapping. As will further be appreciated by those familiar in the art, the infeed conveyor at the deposit station can be supplied with a usual flat cord or a U-shaped tray type of product insert holder.

It will be seen from the positions of FIGS. 1 and 2 respectively of the suction head that a vacuum will be drawn through the nozzle inlet ports when the suction head is in its upper position (FIG. 1) with the open wall facing the suction ports 120 and 111 of the housing 90. When the head is lowered at the deposit station it will be seen that the top wall 130 is carried down past the lower edge of the port 120 of the adapter plate 116. When extended to this position the source of vacuum is cut off from the suction head and the article previously held by the nozzle is immediately released, the vacuum condition in the suction head chamber being vented to atmosphere through the opening 140 in the side wall 134. It will be seen that the point at which the article is released at the deposit station above the pocket of the infeed conveyor is governed by the location of the bottom edge of the port 120 of adapter plate 116. Thus by adjustment of this lower edge and the stroke of the rod 76 the releasing action may take place as may be expedient for any candy bar or other article being transferred. For example, a flat article may be released at a closer point to the infeed conveyor, while an article of greater thickness may be released by the nozzle at a relatively high point above the conveyor. With the construction shown a great variety of conditions may be utilized for accommodating many types and sizes of articles.

In FIGS. 5 and 6 an alternative form of port arrangement is shown in the carriage suction passage connection to the suction head chamber. The external dimensions and nozzle of the suction head are shown as substantially the same as the form of the same elements above described with reference to FIGS. 1–4. The alternative port arrangement is, however, somewhat more versatile and may operate to release an article more readily.

In FIGS. 5 and 6 the port at 111' of the chamber in the lower carriage housing portion 90 and leading to the suction head comprises an elongated slot formed essentially as an open side of the chamber. Thus a nylon adapter plate, as plate 116', to be fitted against the planar surface at 112' may be provided with a greater range of vertical openings, the opening being here shown at 120'. With a greater vertical dimension of opening 111' the lower edge of opening 120' of the plate may be fixed at any desired point above the lower edge of opening 111' and thus provide for cutting off communication to the suction chamber and releasing an article. Thus a longer stroke of the suction head is available for a greater variety of conditions either to suit a particular candy bar shape and configuration or the particular level on which the infeed conveyor is travelling in a particular installation.

It is also to be noted from FIG. 5 that an opening 140' is provided in the front side wall 134' having its upper edge immediately below top wall 130. A shutter plate 142' mounted as by bolts 180 against the outer wall of the guide block 96 of the carriage extends below block 96 and has an opening at 182 for registering with opening 140'. Vertical slots are indicated at 181 in plate 142' for adjusting the vertical position of the shutter and thus the relationship of the opening at 182 with respect to the opening 140' in the upper position of the head. In addition, a second shutter 184 is vertically slidable on shutter 142' having vertical slots at 186 through which bolts 188 are attached to the wall of shuttter 142' for a "fine" adjustment of the passage to atmosphere from the suction head chamber.

With the adjustable shutter features as outlined the suction forces aplied at the nozzle can be varied as may be suitable. With the lower end of the shutter 142' extending below the guide block 96 an outer guide is also provided for movement of the head. Also, it may be noted from the relative positions of the head in the FIG. 5 and FIG. 6 positions that the opening 140' will pass downwardly against the lower end of shutter 142' and during this portion of its travel will be blocked off from the atmosphere until the lower edge of opening 140' passes by the lower end edge of shutter 142'. It will thus be seen that as an article is lowered to its releasing position a greater force of a momentary nature will be applied to the article held by the nozzle. This will result in pressing a candy bar against the nozzle to a slightly greater degree so that when the opening 140' is open to atmosphere and the suction port 120' is blocked off at the end of the downward stroke, the bar will be released with a more positive action inasmuch as the bar will be released, not only by the separation of the vacuum source from the suction head, but also by the resilient nature of the particular material used for the block of the nozzle.

What is claimed is:

1. In apparatus for transferring candy bars and like articles from a pick up station to a deposit station having a suction head provided with a through passage leading to an article engaging nozzle, means for moving said head back and forth between said stations, and suction passage means having one end thereof movable with said head for communication with said through passage of the head and means at the other end for connection to a source of vacuum, the improvement which comprises:

the head and said one end of the suction passage means having opposed portions provided with ports therein and being mounted for relative movement between a position of registration of said ports and an offset postion of the ports, said opposed portions having means separating the ports in the latter position, said through passage of the suction head between the port and nozzle thereof having an apertured portion open to atmosphere for regulating the suction force of said nozzle while said opposed ports are in registration and for venting said head passage and release of an article when said offset port position is established, means for imparting relative movement of said head and suction passage means and establishing the offset position of the ports at said deposit station, and, for the remainder of said head movement between stations maintaining a registration position of the ports.

2. In article transfer apparatus:

a carriage member movable between a pick up station and a deposit station along a first path of travel, a suction head mounted for movement on said carriage between a retracted and an extended position and having a chamber provided with a port at one end and an article engaging nozzle at the other end, movement of said head being along a second path of travel transversely related to said first path of travel said carriage having a suction passage therethrough with a port communicating with the port of the chamber of said suction head for the major portion of the movement of said head from retracted position, said chamber having an apertured portion between the port and nozzle thereof open to atmosphere for regulating the suction force applied at said nozzle when said head and carriage ports are in communication, means for moving said suction head back and forth along said second path of travel including means for positioning the head in a retracted relationship at said pick up station to engage and pick up an article by said nozzle, and when the carriage is moved to said deposit station to fully extend said head, said head adjustment its fully extended position separating the ports of the head chamber and carriage thereby venting said head chamber to atmosphere through said apertured portion for releasing an article.

3. The structure of claim 2 in which said first path of travel is horizontally disposed and said second path of travel is vertically disposed and said means for positioning the head in a retracted relationship at said pick up station includes means for partial extension of said head for picking up an article.

4. The structure of claim 2 in which:

said carriage suction port is formed in a wall of the carriage lying at an angle to said first path of travel and against which said suction head is mounted for movement, and said suction head chamber has an open side facing said carriage wall and covering said suction port in its retracted position, the movement of said head to its fully extended position carrying said open side of the chamber beyond said port.

5. The structure of claim 4 in which:

said carriage includes a vertically disposed bearing guide offset beyond said ported wall and in overhanging relation thereto, said suction head has a guide rod secured at its upper end and received in said overhanging bearing guide, and the means for moving the head between retracted and extended position is connected to said head.

6. The structure of claim 5 in which:

said carriage has a housing containing said suction passage and a horizontally disposed guide rod is fixed to the end of said housing, said guide rod is received in a stationary bearing guide, and means are connected to said housing for reciprocably moving said carriage between an extended position at the pick up station and a retracted position at said deposit station.

7. The structure of claim 6 in which:

a support for said means for movement of the suction head and said means for movement of the carriage is provided with an upwardly extending frame on which each of said means is mounted in overhead relation to said carriage.

8. The structure of claim 7 in which:

the carriage and suction head moving means each include a bell crank lever with an upper arm having a cam follower, a cam with a groove engaging the follower, and a lower arm having an adjustable driving link pivotally connected at the end thereof, the driving link for said suction head being pivotally connected thereto and in vertically disposed relation, the driving link for said carriage housing being pivotally connected thereto and in horizontally disposed relation.

9. The structure of claim 8 in which:

the fulcrum of said bell crank levers is carried on said frame on a common axis, said grooved cams are carried on a common drive shaft journalled on the top of said frame, and the stationary bearing guide for said carriage guide rod is formed at the base of said support.

10. Article transfer apparatus for delivering candy bars and the like from a pick up station to a deposit station comprising:

a carriage member movable back and forth between said stations having a housing formed with a suction chamber and connecting means for a source of vacuum and an exterior housing wall transversely disposed to the path of carriage movement provided with an intake port to the chamber;

a suction head movable in a path between retracted and extended positions facing said ported carriage wall;

said head being provided with an upper wall and side walls forming a head chamber with an open side wall section disposed in opposed relation to and in communication with the port of said carriage housing wall for the major portion of travel of the head, one of said head chambers forming walls having an apertured portion open to atmosphere for regulating the suction force applied to said chamber and said upper wall when in extended position of the head exposing said carriage intake port to atmosphere said carriage member and said head having interengaging means for guided movement of the head between its said retracted and extended position; and an article engaging nozzle member at the base of said head having at least one port therethrough communicating with the head chamber for picking up an article by vacuum at a pick up station, and, at said deposit station with the head in extended position, releasing the article on the opening of said carriage port to atmosphere and the venting of said head chamber through its said apertured portion.

11. The structure of claim 10 in which:

a side wall of said suction head chamber is provided with said apertured portion open to atmosphere, and adjustable shutter means are provided to vary the size of said aperture and thereby adjust the suction force applied at the nozzle port.

12. The structure of claim 11 in which:

said nozzle member is formed by a rigid plate with means for attachment to the head and said plate is provided at its undersurface with a block of resilient material.

13. The structure of claim 11 in which:

said carriage housing wall has an adapter plate detachably fixed thereto over which said suction head is moved, said plate has an opening registering with and of a different size than said intake port, and means are provided for adjusting the position of the plate relative to said intake port, whereby the positional adjustment of the lower edge of said plate opening determines when an article is deposited by said suction head nozzle.

14. The structure of claim 13 in which:

said shutter means for the suction head aperture to atmosphere includes a vertically adjustable first shutter member mounted on said carriage member, said first shutter member has a lower wall portion lying along that side wall of the suction head remote from said adapter plate and said lower wall portion is provided with an opening registerable with said suction head aperture, and a second shutter member is adjustably mounted on said first shutter member to vary said opening of the first shutter member, said suction head in extended position carrying the aperture thereof beyond the lower edge of said first shutter member.

15. The structure of claim 14 in which:

the upper and lower edges of the intake port of said carriage housing suction chamber coincide with the top and bottom walls of said chamber, said adapter plate has an opening, the upper edge of which may be positioned by adjustment of the plate to register with the upper edge of said intake port, and the shuttered aperture of said suction head chamber is formed with the upper edge thereof adjacent the top wall of the head, said lower wall portion of the first shutter member below said opening therein being of greater vertical dimension than said aperture of the suction head chamber.

16. In article transfer apparatus:

a carriage member movable between a pick up station and a deposit station along a horizontally disposed first path of travel, delivery means for conveying articles to successively present the same at said pick up station, the delivery path of conveyance being aligned with and generally parallel to said first path of travel, a suction head mounted for movement on said carriage between retracted and extended positions and having a chamber provided with an article engaging nozzle, movement of said head being along a second path of travel in vertical transversely disposed relation to said first path of travel, said carriage having a suction passage therethrough with a port communicating with the chamber of said suction head for the major portion of the movement of said head from retracted position, means for moving said suction head back and forth along said second path of travel including means for positioning the head in a retracted relationship at said pick up station to engage and pick up an article by said nozzle, and when the carriage is moved to said deposit station to fully extend said head.

said head adjacent fully extended position separating the head chamber from said carriage suction port for releasing an article, and receiver means for conveying articles from said deposit station having a path of movement in offset relation below said delivery means and article engaging elements mounted at spaced intervals along said receiver means for spaced conveyor engagement of articles released at the deposit station by the suction head.

References Cited

UNITED STATES PATENTS 2,301,892 11/1942 Lewis.
2,915,201 12/1959 Calehuff.

GERALD M. FORLENZA, Primary Examiner

G. F. ABRAHAM, Assistant Examiner

U.S. Cl. X.R.

214—89; 294—64